3,326,764
CHEMICALLY AND BIOLOGICALLY PURE SECRETIN POLYPEPTIDE AND UNIT DOSAGE CONTAINING THE POLYPEPTIDE
Johan Erik Jorpes, 8 Torsgatan, Stockholm, Sweden, and Viktor Mutt, 2 Safflegatan, Farsta, Sweden
Filed Dec. 6, 1962, Ser. No. 242,630
2 Claims. (Cl. 167—74)

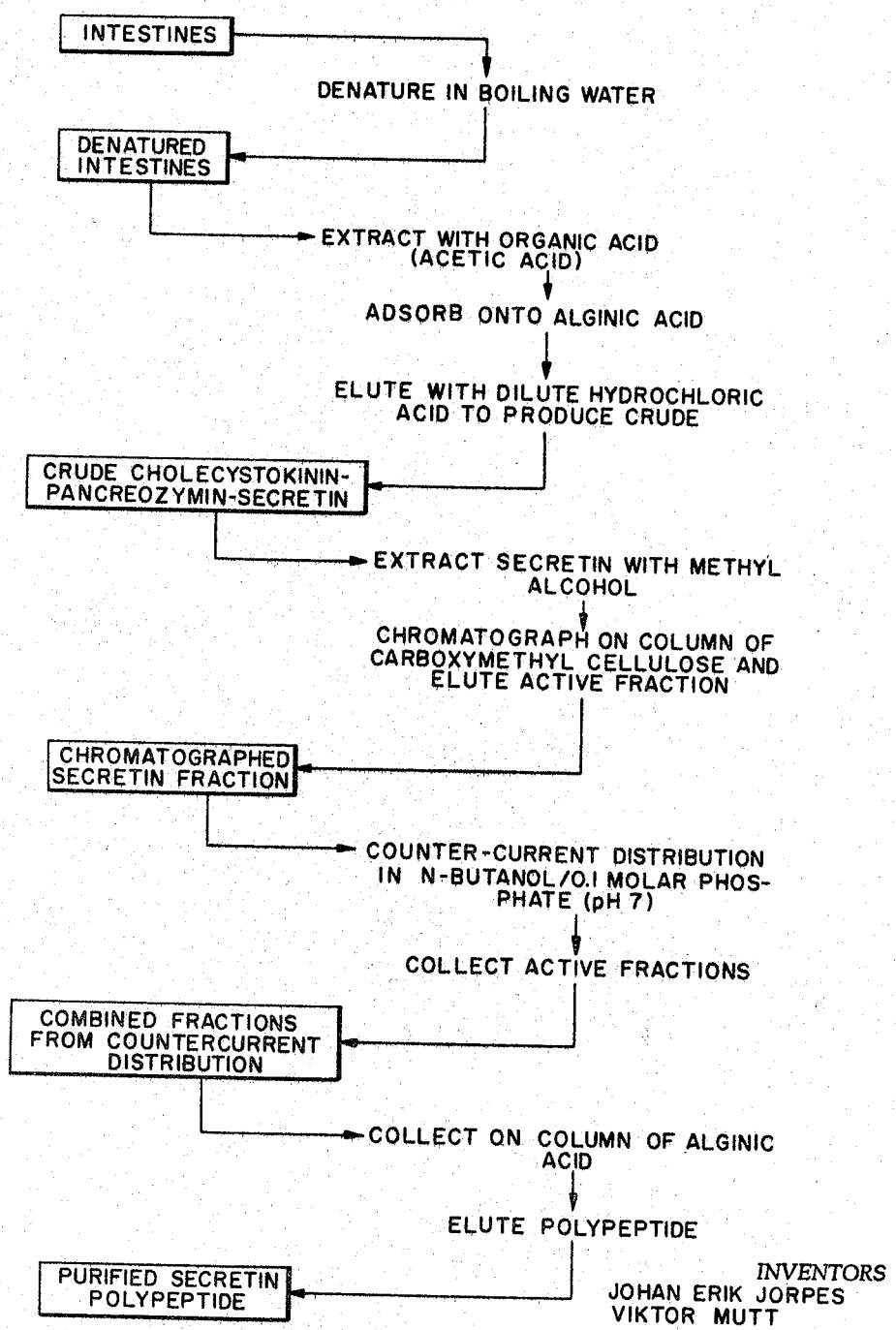

The present invention relates to chemically and biologically pure secretin, to its structure in terms of the amino acids making up the component parts thereof, and to a method for its preparation.

Historical

The discovery of the gastrointestinal hormone secretin by Bayliss and Starling in 1902 is generally agreed by medical historians to mark the modern epoch of the start of the study of hormones in the annals of medical science. See Friedman, "Gastroenterology," 26, 795 (1954). Indeed, the name hormone was coined in connection with this discovery, although the concept of autocoid substances acting over the blood stream on different organs had been suggested years earlier, when Oliver and Schäfer in 1894 discovered the pressor action of the pituitary and the adrenal and when Abel isolated crystalline epinephrin in 1901. The story of secretin has, since 1902, been written in an overwhelming literature, such as in reviews by Greengard "The Hormones," volume I, Academic Press, New York (1948); by Babkin "Secretory Mechanism of Digestive Glands," Ed. P. Hoeber, New York (1950); and by Gregory, "Secretory Mechanisms of the Gastrointestinal Tract," Physiological Society Monographs No. 11, Arnold, London (1962).

The immense physiological work done on secretin has necessitated comprehensive reviews at about 5 year intervals continuously since 1930 to keep the physicians current and typical reviews are by outstanding scientists such as Ivy, in 1930; Still, in 1931; La Barre, in 1936; Celentano, in 1938; Greengard, in 1948; Grossman, in 1950 and 1958; and Gregory, in 1962.

Pavlov through his discovery in the 1890's of the dual secretory mechanism of the pancreas was the first to describe the secretin effect, i.e., secretion of water and bicarbonate from the pancreas after introducing acid into the duodenum and he was also the first to differentiate this secretion from the vagus effect.

Early efforts for purification

As a result of this enormous activity, a great stimulus has been created towards successful methods for preparing the secretin hormone in pure form. Purification techniques were proposed in 1925 by Penau and Simonnet [Bull. Soc. Chem. Biol. 7, 17 (1925)] and by Mellanby [J. Physiol. 60, 85 (1925)]; in 1926 by Weaver et al. [JAMA 87, 640 (1926)]; in 1930 by Ivy et al. [Am. J. Physiol. 95, 35 (1930)]; and by Still [Am. J. Physiol. 91, 405 (1929/30]; in 1933 by Hammarsten et al. [Biochem. Ztschr. 264, 275 (1933]; and in 1938 by Greengard and Ivy [Fed. Proc. 4, 26 (1945)].

Biological purity and assay

As a result of the work of Hammarsten and collaborators in Europe and of the American workers under Ivy, there have been developed the accepted techniques of biological assay in the U.S. and in Europe.

Ivy proposed in 1959 [Acta Physiol. Scand., vol. 45, page 220 (1959)] the dog unit for secretin which is defined as the amount of dried material in normal saline solution which, when injected intravenously in an anasthetized dog weighing from 10 to 20 kg., during 10 to 15 seconds, will cause a 10 drop (0.4 mg.) increase in the flow of pancreatic juice from the cannulated duct during a period of 10 minutes, the control or basal flow not being more than one drop in two minutes. The secretin employed in this assay is required to be free from vasodilatin. The Ivy cat unit for secretin is defined in similar terms, one dog unit corresponding to two cat units.

Hammarsten et al. in 1928 introduced the European assay unit, e.g., the Hammarsten cat unit, hereinafter abbreviated as HCU, which is based on the principle of titrating the amount of alkali secreted with the pancreatic juice. The validity of the HCU unit in the cat is justified on the basis that within the straight line part of the dose-response curve in cats [see Wilander et al. Biochem. Z. 250, 489 (1939)] and in man the alkali so titrated is almost stoichiometrically proportional to the dose of secretin injected [see Werner et al. Scand. J. Clin. Lab. Inv. 6, 228 and Hammarsten, Acta Med. Scand. 92, 256 (1937)].

One HCU is defined as the amount of secretin, which in the cat induces secretion of 0.1 ml. of 0.1 N bicarbonate in the 15 minute period following injection.

Although other test animals, such as rabbits, have been studied and suggested, there is substantial agreement in Europe that the cat unit, HCU, is the basic unit for assay and in the U.S. that the unit based on the same animals, cat or dog, should be the standard.

The common unit now accepted in the United States is the clinical unit, which has been related to the HCU by Lagarlöf [Acta. Med. Scand. Suppl. 128 (1942), Macmillan N.Y., 1942], e.g., 16 HCU=1 clinical unit. The clinical unit has also been related to the Ivy unit, as 1 clinical unit equals one dog threshold dose under the Ivy definition [see Greengard and Stein, Proc. Soc. Expl. Biol. Med., N.Y., 46, 149 (1941)].

A relatively recent measurement of the clinical unit in terms of the Hammarsten unit was made by Greengard and Ivy in 1938 who determined that one Ivy dog threshold dose is equivalent to 20 Hammarsten cat units and this 1 to 20 ratio is the one generally preferred because of its historical continuity relating back to the first Ivy standards.

The method of the invention

The method of purifying secretin to obtain biologically pure secretin having an activity of 20,000 clinical units per milligram or 400,000 HCU per milligram starts from a crude cholecystokinin-pancreozymin-secretin concentrate or similar secretin concentrate obtained by boiling the intestine of the animal, usually hog intestine, as soon as possible after the animal is sacrificed in order to denature enzymes which destroy the labile secretin hormone and to coagulate the bulk of the protein material, whereafter the crude secretin concentrate is prepared in the form of a dilute, 0.5 N, acetic acid extract which is percolated through the boiled protein material at room temperature. Under room temperature conditions the dilute acetic acid does not extract protein from the boiled intestine and the amount of nitrogenous material dissolved in the acid is at a minimum in comparison to the extraction carried out on unboiled intestine using the same or a mineral acid.

Crude secretin in the form of a moist precipitate is generally obtained from the acid extract by saturating with salt, e.g., salting out. A typical run using ice cold 0.13 N HCl to extract 100 meters of unboiled hog intestine provides, after saturation of the extract with sodium chloride, about 300–350 grams of moist crude secretin precipitate containing about 40–60% of moisture.

These methods of preparing the crude extract by extracting the intestine with aqueous acids, either boiling or cold or with ethanol, are well-known but the extraction carried out with intestines which have been immersed in boiling water as soon as they are obtained is a contribution by the present inventors. It has been discovered that adsorption of the active secretin from the acid extract onto alginic acid at room temperature prior to salting out provides a far better purification than salting out directly. Furthermore the reduction in volume greatly facilitates the salting out. The yield of secretin based on secretin activity is in this new type of salt cake about twice as high while the amount of material recovered by alginic acid adsorption is 30 times smaller. Thus, using the preferred starting material obtained by eluting the adsorbed secretin with dilute aqueous HCl from the alginic acid adsorbent, the activity of the secretin is about 50–60 times higher in the preferred starting material than in the old type of salt cake. The preferred method of the invention utilizing alginic acid adsorption and elution with dilute HCl produces 100 grams of precipitate from the HCl eluate based on 1000 meters of hog intestine.

The preliminary steps of purifying the crude material in the form of the salted out cake after elution with HCl and saturating with NaCl generally follow the usual methods of preparative polypeptide chemistry, which comprise the steps of washing the salted out crude cake from the alginic acid eluate, and fractionating this crude by treating with organic solvents, e.g., ethanol or methanol. To illustrate the increase in strength by such preliminary purification steps, a typical run starting from 75 kilograms of boiled then frozen hog intestines (1000 hogs) yields about 100 grams of crude material containing about 5% N and having an activity of 60 HCU/mg. Redissolving this crude in 95% ethanol, pH 7.0, filtering, acidifying with dilute HCl and adsorbing onto alginic acid (prewashed with dilute HCl) at room temperature provides after elution from the alginic acid a salted out precipitate of about 20 grams and this precipitate redissolved in water and again salted out at pH 4.5 has an activity of 300 HCU/mg. and contains 10% N.

This precipitate extracted with methanol at 4° C. left undissolved crude cholecystokinin and pancreozymin (about ⅓ of total weight starting material) and the methanol solution was filtered. The filtrate was treated with ether to precipitate the first free secretin fraction which has an activity of 7000 HCU/mg.

Dissolving the precipitate in cold water and fractional precipitating with acetone at pH 7.0 followed by lyophilization provided an activity of about 16,000 HCU/mg.

Further purification can be carried out either by electrophoresis on cellulose columns in highly dilute ammonium bicarbonate, wherein separation is made on the basis that the impurities migrate faster to the cathode than does secretin or alternately by chromatography on carboxymethyl celulose in highly dilute ammonium bicarbonate. Purification by the first method of electrophoresis on cellulose produces an active fraction containing 4000 clinical units/mg. or 80,000 HCU/mg., while lyophilization by chromatography on CMC produces an active fraction of about 7500 clinical units/mg. or 150,000 HCU/mg.

The purified product following elution from CMC was examined by the standard methods of two dimensional paper chromatography and starch gel electrophoresis. Surprisingly, by both of these test methods, this purified product of activity of 7500 clinical units/mg. behaved as a homogeneous protein.

It was only when the material was subjected to Craig counter-current extraction distribution in a system using dilute aqueous phosphate buffer at pH 7.0 and normal butanol that the CMC purified material was found to be impure. In this manner a chemically pure secretin product was obtained assaying at 400,000 HCU/mg. or 20,000 clinical units/mg., which represents a three-fold increase in activity as compared with the product from CMC chromatography.

Thus it is seen that the essential step in the purification process of the present invention in achieving a chemically and biologically pure secretin is the final step of counter-current distribution of the CMC chromatography product. From this step it has been possible to completely characterize secretin as a polypeptide consisting of the following eleven amino acids in the proportions of micromoles ($\mu$m.) per milligram as set out below.

| Amino acid: | $\mu$m. per mg. pure secretin |
| --- | --- |
| Alanine | 0.272 |
| Arginine | 0.988 |
| Aspartic acid | 0.489 |
| Glutamic acid | 0.683 |
| Glycine | 0.486 |
| Histidine | 0.202 |
| Leucine | 1.400 |
| Phenylalanine | 0.262 |
| Serine | 0.844 |
| Threonine | 0.444 |
| Valine | 0.246 |

*Stability of secretin*

It is important to note, in the light of the foregoing history of biological assay, that despite the large number of techniques proposed for purification and despite the number of successful clinical trials with secretin as a diagnostic tool in pancreatic disorders of man (about 25 clinical reports since 1940), there has not yet been achieved, prior to the present invention, a purified hormone preparation which was sufficiently stable in ordinary storage to be capable of being used as a standard sample for comparison over a period of many years. To illustrate the difficulty encountered in standardization because of the lability of the purified secretin, it is noted that the International Conference held in 1953 on assay of standardized secretin, attended by representatives from eight countries, failed to come to agreement because some samples suffered loss of activity in one year and other samples, although they seemed to be stable over 4 or 5 years, appeared to be of insufficient strength to be the standard sample of choice for international standardization.

*Summary of biological purity*

There is summarized below in tabular form prior effects for attaining purified secretin and in each instance the literature citation supporting the reported determination is cited in the right hand column of the table. At the bottom of the table there is presented the biological assay of the purified material of the invention, biologically pure secretin.

TABLE I

| Year | Worker | Method | Activity/mg. Clinical Units | Activity/mg. HCU | Literature |
|---|---|---|---|---|---|
| 1933 | Hammarsten | Precipitation as picrolonate from pyridine or aniline; derivative split. | 12.5 | 250 | Biochem. Z. 264, 275 (1933). |
| 1938 | Ivy and Greengard | Picrolonate | 14 | 280 | Am. J. Physiol. 124, 427 (1938). |
| 1941 | Greengard and Stein | Commercial sample pancreotest, prepared in Sweden. | 2 | 40 | Proc. Soc. Exp. Biol. Med. N.Y. 46, 149 (1941). |
| 1941 | Harper | Extraction | 50 | 1,000 | J. Physiol. 99, 415 (1941). |
| 1952 | Thomas | do | 50 | 1,000 | Acta. Gast. Belg. 15, 811 (1952). |
| 1962 | Kuroyanagi et al | Commercial Lilly Secretin RT 1424 | 1.67 | 33 | Am. Journ. Physiol. Vol. 203 (2) pp. 241-2. |
| 1954 | Jorpes & Mutt | Extraction with acetic acid purified with stearic acid. | 1,100 | 22,000 | Arkiv. f. Kemi Vol. 8, 49 (1955). |
| 1959 | do | Extraction with acetic acid and electrophoresis. | 4,000 | 80,000 | Arkiv. f. Kemi Vol. 14, p. 275 (1959). |
| 1959 | Mutt | Methanol extraction chromatography on CMC. | | | Arkiv. f. Kemi Vol. 15, p. 69 (1959). |
| 1961 | Jorpes & Mutt | Methanol extraction chromatography on CMC. | 7,500 | 150,000 | Am. J. Internal. Med. Vol. 55, p. 395 (1961). |
| Present Invention | | Methanol extraction chromatography, counter-current distribution in butanol and phosphate buffer. | $2 \times 10^4$ | 400,000 | Acta. Chem. Scand., Vol. 15, p. 1790 (1961). |

As indicated in Table I above two groups of investigation Hammarsten et al. and Ivy and Greengard claimed in the 1930's that they had obtained secretin as a crystalline picrolonate on evaporating concentrated pyridine or aniline solutions of the secretinpicrolonate. The protein moiety made up 20% of the "crystalline" material of one group, 80% of that of the other group. The crystals were later shown to consist of pyridine and aniline picrolonates, respectively, with some secretin adsorbed on them. The maximal activity of the polypeptide moiety of the picrolonates was 1250 HCU.

The introduction of chromatographic methods into protein chemistry presented new possibilities.

In 1957, Legge, Morieson, Rogers and Marginson described the preparation of secretin with an activity of about 30,000 HCU/mg. The highest activities were obtained by means of countercurrent distributions and by chromatography on silica gel. On the basis of gel electrophoretic analysis according to the method of Smithies they inferred that the material was still not homogeneous.

Carboxymethyl cellulose was used for the purification of secretin by Newton, Love, Heatley and Abraham in 1959, who adsorbed secretin from crude preparations on CMC buffered at pH 4 with barium acetate, eluted impurities with 0.02 N acetic acid, and the secretin, much purified, with 0.1 N acetic acid. Material prepared in this manner had an activity of 880–4,400 HCU/mg. and could by countercurrent techniques be purified further to about 1,800 HCU/mg.

Fishman believed in 1959 to have isolated secretin by electrophoresis on polyvinyl chloride powder at pH 7.5. He carried out a thorough analysis of the material obtained and correctly inferred that tryptophon, proline and the sulfur containing amino acids were absent from secretin. However, his material still contained lysine, isoleucine and tyrosine. The activity of the material was astonishingly low, only 55 clinical units per mg. as compared with the $2 \times 10^4$ clinical units of the pure substance, this is possibly due to inactivation during the preparation.

In spite of the interest the medical public has shown in secretin from the 1930's up to the present time, it soon disappeared from the market. Technical difficulties associated with its preparation and the lability of the product are responsible for the discontinuation of the product by original manufacturers and secretin is available on special request for research purposes, enabling recent workers to perform their clinical studies in this field.

During recent years the secretin test has been taken up again, and its potentialities definitely demonstrated by Dreiling and his colleagues (Dreiling and Janowitz, 1957; Dreiling, Nieburgs and Janowitz, 1960) and by Sun and Shay (Sun and Shay, 1957, 1960; Shay et al., 1961) in the United States and by Harper and his colleagues (Burton et al: 1960) in England. Interest in it has been greatly stimulated by the possibility of diagnosing cancer of the pancreas, the bile ducts and the gallbladder with a combined secretin-cholecystokinin test (Dreiling, Neiburgs and Janowitz, 1960; Bowden and Papanicolaou, 1960).

Summary of method of invention

Briefly summarizing the method of the invention which produces chemically pure secretin as a valuable pharmaceutical agent, it is emphasized that the method of the present invention works equally well on a small as on a large scale. The intestines are collected as soon as possible and immersed for a few minutes into boiling water in order to destroy the proteolytic enzymes and coagulate the proteins. The polypeptide hormones are then extracted with dilute acetic acid at room temperature and adsorbed from the extract on alginic acid. From the alginic acid they are eluted with dilute aqueous hydrochloric acid and precipitated from the eluate with sodium chloride at saturation.

From this crude starting material the secretin is purified, and separated from the bulk of the cholecystokinin and pancreozymin, also found in the crude material, by extraction into methanol. The methanol soluble material is chromatographed at pH 8 on carboxymethyl cellulose. At this stage the material assays in different preparations at anywhere between $6 \times 10^4$ and $1.5 \times 10^5$ HCU per mg.

The decisive step in this work was the elaboration of a new method for preparing a crude concentrate of secretin, cholecystokinin and pancreozymin on a large scale to be used as starting material as defined in United States Patent Number 3,013,944. Final purification is achieved by counter-current distribution in an oxygen-free atmosphere in the system n-butanol-0.1 M phosphate buffer at pH 7. The pure material has an activity of $4 \times 10^5$ HCU mg., constant in different preparations.

Physiological effect

The pure or highly purified secretin gives in many respects a different picture from the impure preparations. A number of authors have observed an increased flow of lymph through the thoracic duct in the dog and in man after administration of secretin, a flow which was considered to originate in the pancreas. As recently shown by the Dreiling group (Razin, Feldman and Dreiling, 1961), the effect was the same in the dog even after pancreatectomy, but there was almost no effect at all when pure secretin Vitrum, Stockholm) was used. Evidently the lymph flow was caused by an increased intestinal muscular activity and diliation of the mesenteric lymphatics elicited by impurities like Substance P, Villikinin or Darmstoff in the less pure secretin preparations.

The choleretic effect of secretin observed already by Bayliss and Starling has been repeatedly studied both in dogs and in man. Secretin was found to stimulate the liver to excrete water, an action analogous with that on the pancreas. This question as well as the question of the secretion of juice from the intestine and the glands of Brunner, cannot be determined without an access to pure preparations of secretin. In fact the effect on the liver is yet to be observed in using the highly purified secretin. The inventors have obtained an increase in the bile flow of 50 percent in the dog, and J. E. Thomas in using one of their preparations with 4000 clinical units per mg. found in two cholecystectomized bile fistula dogs approximately 100 percent increase in bile flow over basal secretion. The effect lasted for about 20 minutes (personal communication). The pure secretin stimulates the excretion from the liver not only of water but also of bicarbonates, as observed recently by Sleisenger and O'Brien of the New York Hospital.

Lagerlöf (1942) found, in 48 healthy subjects, the mean volume of pancreatic juice collected in 60 minutes to be 202±4 ml. (2.2–5.5 ml. per kg. body weight), the corresponding figure for 0.1 N bicarbonate being 194±6 ml.

In 1950 Dreiling made a statistical study in 172 normal persons of the response in the secretin test as to volume and alkalinity of the pancreatic juice after one clinical unit of secretin per kg. body weight. The secretin used was supplied by Astra in Sweden and by the Wyeth Co., Philadelphia, an equal number of persons being treated with each of the two brands. The collecting period was 80 minutes. The frequency distribution curve of the data for people with no pancreatic disorder was essentially symmetrical, with a range between 2.0 and 4.4 ml. of pancreatic juice per kg. body weight, mean 3.57±0.68 ml.

In administering one clinical unit per kg. body weight of the Eli Lilly secretin to 123 normal subjects, and collecting the duodenal content during four twenty-minute periods, Dreiling and Janowitz (1957) found on an average 3.22 ml. of pancreatic juice per kg. (lower limit 2.0 ml.) and maximal $NaHCO_3$ concentration 107 m. eq./l. (lower limit 90).

The technique of Dreiling is generally accepted (Aktan and Klotz, 1958), even if some authors prefer to use the 60-minute values. This consequently should be the lead to follow in adjusting the strength of the clinical unit of secretin, of which for practical reasons one unit is to be given per kg. body weight (in infants twice the amount).

*Strength of the clinical unit of chemically pure secretin*

The relative strength of a secretin preparation can easily be determined by comparing its action in the cat or the dog with that of a standard sample. Within a certain range, complete stoichiometry is present between the quantity of secretin injected intravenously and the quantity of bicarbonate secreted by the pancreas.

The inventors have used a standard sample of secretin of their own, assayed in 209 tests on cats at 8400 cat units per mg.—one unit equalling 0.1 ml. 0.1 N-$NaHCO_3$— or 420 clinical units/mg. One microgram of the standard produced 1.11±0.17 ml. of pancreatic juice in the anaesthetized cat (46 tests), 1.5 µg. 1.68±0.163 ml. (118 and 3 µg. 2.40±0.51 ml. (25 tests). Twenty cat units are taken as a clinical unit.

*Clinical use*

The early literature on secretin stresses its clinical value. The technique applied in the pancreatic function test is that of Lagerlöf 1942 (l.c.) as modified by different authors (Dreiling and coworkers, Raskin et al.). The value of the combined study of the serum enzymes and the duodenal contents in the secretin test has been pointed out by Dreiling and Richman [Arch. Intern. Med. 94, 197 (1954)], Lagerlöf and Perman [Acta Chir. Scand. 111, 22 (1956)], Sun and Shay [Gastroenterology 32, 212 (1957) and Gastroenterology 38, 570 (1960)], Marks and Tompsett (Quart. J. Med. N.S. 27, 431 (1958)], Burton et al. [Gut 1, 111–124 (1960) and Gut 1, 125–139 (1960)], Shay et al. [Am. J. Dig. Dis. 6, 142 (1961)] and by Goldenburg et al. [Amer. Practit, 12, 415 (1961)].

New aspects on the use of the secretin test appeared, when it was found that the exfoliative cell analysis allowed the identification of malignant cells in the duodenal contents after secretin injection. When supplemented by a subsequent or previous injection of cholecystokinin-pancreozymin the secretin test gained still more in value. Malignant processes could be detected not only in the different parts of the pancreas in cases with pancreatic carcinoma but also in the gallbladder and in the bile ducts in up to 50–70% of the cases known to have cancer, and in 85–90% when the histological evidence was combined with that obtained from chemical analysis of the duodenol contents (Wenger and Raskin [Gastroenterology 34, 1009 (1958)], Raskin et al. [Gastroenterology 34, 996 (1958)], Bowden and Papanicolaou [Acta Union Contra Cancr. 16, 398 (1960)], Dreiling et al. [Med. Clin. N. Amer. 44, 801 (1960)].

On the basis of the foregoing reports it will be seen that medical workers in the field have long been satisfied of the clinical value of secretin preparations but have been hampered in their effective clinical use of secretin because of impurities which have prevented achieving uniform results and positive results without the occurrence of undesired side reactions. Even the impure high strength secretin materials having a strength of 70,000 and of 150,000 HCU/mg. respectively have been found to have protein impurities containing lysine, tyrosine, proline and isoleucine associated therewith in significant amounts, which are sufficient to induce side reactions and preclude the effective use of the material. It is only the protein-free polypeptide preparation of maximum activity, i.e. 400,000 HCU/mg., which is effective for the clinical secretin test in man at a dose of about 4 micrograms which is completely free of side reactions and offers for the secretin test in clinical medicine advantages shared by no prior purified secretin preparation.

The invention will be further illustrated by, but is not intended to be limited to the following example.

EXAMPLE 1

*Treatment of crude material*

The uppermost meter of hog intestine was removed from the animals as soon as possible, cleansed of the bulk of adhering fatty tissue, emptied of its contents and flushed with cold water. It was then immersed, without being everted, for 5–10 minutes in vigorously boiling water. The boiled intestines were stored at about −15° C. for not longer than one month. They were worked up in batches of 1000 intestines each. The intestines in such a batch weighed about 70 kg. They were minced in the frozen state and extracted with constant stirring overnight at room temperature with 200 litres of 0.5 N acetic acid. Tap water was used for diluting the glacial acetic acid. Two kg. of Hyflo Super-Cel, defined in "The Condensed Chemical Dictionary," 5th edition, Reinhold (1956) as a specially processed grade of diatomaceous earth used as a clarifying agent to aid filtration of liquids containing exceptionally small or colloidal suspended solids, was then added to the extraction mixture, and the resulting suspension filtered through bags of linen cloth. The filtrate was refiltered until it was almost clear, with only a faint opalescence. It was stirred with 2 kg. of alginic acid, which had previously been washed with water, 0.2 N HCl, and water again. The alginic acid containing the adsorbed secretin was allowed to settle for a few hours. The supernatant was discarded, and the sediment transferred to suction filters, on which it was washed with 0.005 N HCl and then with 95% ethanol to remove the fats. The ethanol was either allowed to evaporate, or washed off with 0.005 N HCl. The secretin was eluted from the alginic acid with 20 liters of 0.2 N HCl under stirring for one hour. After filtering, the active material was precipitated from the eluate with sodium chloride at saturation. The precipitate was collected on a suction filter and sucked as dry as possible. The yield of the moist precipitate was about 100 g., with a nitrogen content (Kjeldahl method) of 5–6%. The activity was usually about 60 HCU per mg., and the yield 6000 HCU per meter intestine, in some cases twice as high.

The alginic acid was used repeatedly for at least 10 times. When not in use, the moistened acid was stored in the frozen state.

*Preliminary purification*

73 kg. of boiled frozen intestines from 1000 hogs yielded 105 g. of crude material containing 5.3% N, and with an activity of 60 HCU per mg. The material was dissolved in water at room temperature to a concentration of 5 g. per 100 ml. solution. Two volumes of 95% ethanol were added and the pH of the solution, determined electrometrically, brought to 7.2 with a mixture of one part of 1 N NaOH and two parts of 95% ethanol. The precipitate that formed was filtered off on fluted paper (Whatman 3 MM) and discarded. The clear filtrate was diluted with an equal volume of 0.15% acetic acid. 100 g. of alginic acid, which had been prewashed with 0.2 N HCl and then with water, was suspended in the diluted filtrate. After stirring for one hour at room temperature, the alginic acid containing the adsorbed secretin was collected on a suction filter and washed on the filter with 0.005 N HCl. The filtrate and washings were discarded. Elution of the secretin from the alginic acid with 0.2 N HCl. The eluate was saturated with sodium chloride. The precipitate that formed was collected on a suction filter. It weighed 20.5 g. and contained 9.0% N.

The precipitate was dissolved in water to a concentration of 5 g. per 100 ml., and the pH of the solution brought to 7.2 with 0.1 N NaOH. A precipitate formed. 2 g. of Hyflo Super-Cel clarifying agent, as previously defined, prewashed with 2 N HCl and water and dried at 150° C., were added to every 100 ml. of the solution, and the mixture filtered with suction. The filter cake was discarded, the clear filtrate brought to pH 4.5 with N HCl, and saturated with sodium chloride. The precipitate that formed was collected on a suction filter. It was covered on the filter with a layer of soft plastic and sucked as dry as possible. It weighed 14 g., contained 10% N and had an activity of about 300 HCU per mg., corresponding to 4200 HCU per meter intestine.

This precipitate was triturated for 15 minutes at 4° C. with 50 ml. of methanol per g. precipitate. The suspension was filtered on a suction filter. The undissolved material, which contained cholecystokinin and pancreozymin, was washed on the filter with methanol and ether. The air-dry material weighed 5 g. It was stored for later use. The filtrate was brought to about pH 7.5 (glass electrode) with 0.1 M NaOH in methanol. The precipitate that formed was filtered off on fluted paper and discarded. The filtrate was brought to pH 6.0 with 0.1 M HCl in methanol, and precipitated with 2 volumes of ether precooled to −15° C. The precipitate that formed was collected at −15° C. on a suction filter, and washed on the filter with ether. It was then dissolved to a 2% solution in water, and the solution saturated with sodium chloride. The precipitate was collected on a suction filter on hardened paper, which had been moistened with a saturated solution of sodium chloride in water. It weighed 0.35 g., contained 10% N and had an activity of about 7000 HCU per mg. The yield in activity was about 2450 HCU per meter intestine.

This material was dissolved at 4° C. to a 5% solution in water, the pH adjusted to 7.2 with 0.1 N NaOH, and the solution diluted to 2.5% with water. Three volumes of acetone were added to it. The precipitate that formed was removed by centrifugation, and discarded. Nine more volumes of acetone were added to the supernatant. The precipitate that formed was collected by centrifugation and immediately dissolved in water. The pH of the solution was adjusted to about 6 with acetic acid, and the secretin lyophilized. The lyophilized material weighed 100 mg., and had an activity of 16,000 HCU per mg.

*Further purification by chromatography on CMC*
*(pretreatment of the CMC)*

Carboxymethyl cellulose of the Sober & Peterson type [J.A.C.S. 76, 1711 (1954)] was used. 100 g. of this was suspended with vigorous stirring in 5 litres of water. The coarse material that sedimented within a few minutes after discontinuing the stirring was admixed with a considerable amount of darkly coloured particles. The bulk of the material, which was still in suspension, was decanted and the dark sediment discarded. After about 30 minutes most of the decanted material had sedimented. The supernatant was poured off and discarded. This procedure of fractional sedimentation was repeated until no dark-coloured particles could be discerned in the sediment. The CMC was then washed successively with 0.5 N ammonia, water, 1% EDTA, water, 0.2 N HCl and water again. It was then collected on a suction filter, and the moist material stored frozen at −15° C. EDTA is ethylene diamine tetra-acetic acid.

*Packing of the columns*

A glass chromatography tube (15 x 1.4 cm.) with a flat perforated bottom and a plane ground upper edge was used. The bottom of the tube was covered with a double layer of filter paper and the tube immersed in a beaker with 0.02 M ammonium bicarbonate, so that the level of the bicarbonate solution was a few mm. above the level of the filter paper. All air bubbles were removed from below this level. The tube was connected with springs to a 40 cm. glass tube of the same diameter and with plane ground edges. 6 g. of the moist CMC—about 3 g. dry material—was suspended in 0.1 M ammonia and allowed to sediment. The ammonia was decanted and the CMC suspended in 200 ml. of 0.02 M ammonium bicarbonate. Half of the vigorously stirred suspension was poured into the tube. When the CMC had sedimented to a height of about 10 cm. the surface of it was covered with a circular piece of filter paper and the mass compressed with a perforated glass plunger. The plunger and paper were carefully removed, the liquid covering the CMC decanted off and the rest of the suspension poured into the tube. The mass was again compressed in the same way as before. This time the plunger and the paper were left in place. The final height of the column was about 7 cm. The upper tube was disconnected and after washing with 0.02 M ammonium bicarbonate the column was ready for use. About 50 mg. secretin of the potency of about 15,000 HCU/mg. was dissolved in 5 ml. of 0.02 M ammonium bicarbonate and allowed to sink into the column. The column was developed with 0.02 M ammonium bicarbonate with a hydrostatic pressure giving a flow rate of about 40 ml./h. The approximate concentration of the proteinaceous material in the fractions from the column was followed by the Herriott reaction as adapted by Lowry, Rosebrough, Farr and Randall (except that the copper salt containing stock solution of the latter workers was made up in 0.1 N NaOH instead of in water). Impurities emerge first from the column, then the secretin. Other impurities can be eluted with a higher concentration of the ammonium bicarbonate.

The yield of activity in the eluates is about 30–50% of that introduced into the column. After lyophilization, the material was collected in a total of 8 active fractions and these 8 fractions had an activity varying from 35,000 to 70,000 HCU/mg. in the first 2 and last 3 fractions while an activity of 75,000 to 150,000 HCU/mg. was recovered in the middle 2 fractions. These fractions were then subjected to further testing and further purification in accordance with the invention.

*Countercurrent distribution*

60 mg. of the purified material obtained from the 2nd to 5th fractions with a mean activity of $7 \times 10^4$ HCU per mg. was subjected to a 60-transfer counter-current distribution in the system of 0.1 M phosphate buffer/n-butanol, pH 7.0, each phase 10 ml.

The activity was found in tubes 18–30 and the bulk of the proteinaceous impurities in the first four tubes.

The active fractions were combined and 15 volumes of water added. The activity was adsorbed on alginic acid (0.5 g. dry weight) eluted with 10 ml. of 0.2 M HCl and the chloride exchanged for acetate on a column of DEAE-Sephadex in acetate form. After lyophilization the material weighed 3 mg. and assayed at about $4 \times 10^5$ HCU per mg., which means that 1 mg. could stimulate the secretion of 40 litres of 0.1 N bicarbonate solution. DEAE-Sephadex is diethylaminoethyl Sephadex (Pharmacia, Upsala, Sweden).

A preliminary quantitative amino acid analysis according to the Spackman, Stein and Moore technique of 1958 gave the results shown on p. 9, lines 12–24.

The attached flow diagram represents the preferred process of the present invention to produce a standardized biologically pure material of special utility in unit dosage form.

The foregoing achievement of clinical secretin in absolute biological purity provides for unit dosage compositions of the invention which is not the usual concentrate of animal origin but instead is part of the class of powerful drugs, e.g. of the type exemplified by epinephrine and recognized by Goodman & Gilman in the widely used text entitled "The Pharmacological Base of Therapeutics," MacMillan 1955, page 1529. By becoming standardized as a pure material the present composition in unit dosage form eliminates the difficulties which have plagued investigators and clinicians these past 60 years.

Furthermore this material for the first time permits the determination of the exact chemical structure of secretin.

Having thus described the invention, what is claimed is:

We claim:

1. A method for preparing secretin polypeptide having an activity of 20,000 clinical secretin units per milligram, said polypeptide having an amino acid constitution based on micromoles per milligram of 0.272 alanine, 0.988 arginine, 0.489 aspartic acid, 0.683 glutamic acid, 0.486 glycine, 0.202 histidine, 1.400 leucine, 0.262 phenylalanine, 0.844 serine, 0.444 threonine and 0.246 valine, and said polypeptide being free of protein impurity, free from lysine, tyrosine, isoleucine, proline, tryptophan and sulphur containing amino acids, comprising heating animal intestines in boiling water to denature the protein therein, extracting the denatured material with dilute water-soluble organic acid, adsorbing from the extract crude cholecystokinin pancreozymin-secretin containing material using alginic acid as the solid adsorbent, eluting a crude mixture from the alginic acid adsorbent with dilute hydrochloric acid, saturating the eluate with sodium chloride and extracting the precipitate formed with methyl alcohol, precipitating the secretin with ethyl ether, leaving fats in the supernatant liquid, chromatographing the fat-free crude secretin by dissolving in 0.02 molar ammonium bicarbonate solution or a phosphate buffer, pH 8.0, 0.02 molar as to sodium, and adsorbing on a column of carboxymethyl cellulose, eluting and isolating from the column the chromatographed secretin fraction, subjecting said chromatographed fraction to countercurrent distribution in n-butanol-0.1 molar phosphate water buffer at pH 7, collecting a plurality of of purified fractions possessing highest activity from said countercurrent distribution, combining said fractions, collecting the combined active fractions on alginic acid and separating the polypeptide from said adsorbent.

2. A secretin preparation in unit dosage form comprising secretin polypeptide made by the method of claim 1, said polypeptide having an activity of 20,000 clinical secretin units per milligram in a dosage of at least about 4 micrograms of said polypeptide in an inert carrier which is free of nitrogen and sulfur, said inert carrier being selected from the group consisting of saline solution, carboxymethyl cellulose, alginic acid, oxy-cellulose, talc, and bentonite.

References Cited

UNITED STATES PATENTS 3,013,944   12/1961   Jorpes et al. _____ 167—74

OTHER REFERENCES

Jorpes et al., Acta. Chem. Scand., vol. 15, No. 8, pp. 1790–1791.

JULIAN S. LEVITT, *Primary Examiner.*

FRANK CACCIAPAGLIA, *Examiner.*

LEROY B. RANDALL, *Assistant Examiner.*